United States Patent Office 3,299,051
Patented Jan. 17, 1967

3,299,051
CERTAIN SUBSTITUTED 5-KETO-PYRAZOLOTHIAZINES
Robert G. Stein and Hollis G. Schoepke, Waukegan, Ill., assignors to Abbott Laboratories, North Chicago, Ill., a corporation of Illinois
No Drawing. Filed Aug. 7, 1964, Ser. No. 388,269
14 Claims. (Cl. 260—243)

This invention is concerned with new compounds of the Formula A

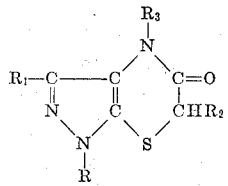

and methods for their preparation. In this and succeeding formulas, R, $R_1$ and $R_2$ represent hydrogen, loweralkyl, phenyl, halophenyl, loweralkylphenyl and loweralkoxyphenyl whereas $R_3$ represents hydrogen, loweralkyl, loweralkenyl, loweralkynyl, benzyl, halobenzyl, lower alkylbenzyl or loweralkoxybenzyl. The terms "loweralkyl, loweralkoxy, loweralkenyl and loweralkynyl" as employed herein refer to those radicals containing from 1 to 4 carbon atoms, inclusive. These compounds are useful as antihypertensive agents and can be employed orally or intravenously per se or admixed with a nontoxic, pharmaceutical, liquid or solid carrier and administered in the form of tablets, solutions, suspensions or emulsions. In a representative operation, an intravenous injection in cats of an aqueous saline solution of the compound of Formula A wherein R and $R_1$ were methyl, and $R_2$ and $R_3$ were hydrogen at a dosage of 10 mg. per kg. of body weight produced an immediate marked drop in blood pressure.

The novel compounds of this invention wherein $R_3$ of Formula A is hydrogen can be prepared by hydrogenating an acid of the Formula B

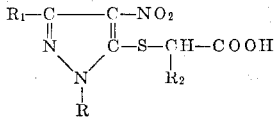

or an ester of the Formula C

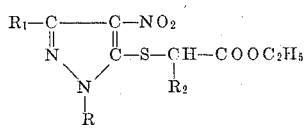

in the presence of a Raney nickel catalyst at a pressure of 2 or 3 atmospheres in either a basic aqueous ethanol solution or ethyleneglycol monomethylether to convert the nitro group to an amino group and thereafter refluxing the amino compound formed in the presence of an acid catalyst such as concentrated hydrochloric acid or p-toluenesulfonic acid to close the ring. The desired product is then recrystallized from ethanol or benzene or other suitable organic solvent.

The compounds wherein $R_3$ of Formula A is other than hydrogen can be prepared from the compounds wherein $R_3$ of Formula A is hydrogen by refluxing with an $R_3$ bromide or chloride wherein $R_3$ as previously defined is other than hydrogen in the presence of an alkali metal hydride in an inert solvent such as a benzene-dimethylformamide mixture. The reaction mixture is then filtered, the filtrate is concentrated and the residue recrystallized to obtain the desired product as a crystalline solid.

Further details of the preparation of the compounds of the present invention are shown in the following examples.

Example 1

R=phenyl; $R_1$=methyl; $R_2$ and $R_3$=H in Formula A

Eleven grams (0.04 mole) of α(1-phenyl-3-methyl-4-nitro-5-pyrazolylthio)acetic acid were dissolved in 100 ml. of ethanol and 50 ml. of 5% aqueous sodium hydroxide. Three grams of Raney nickel were then added and the mixture was treated with hydrogen gas at 3 atmospheres pressure overnight in a Parr shaker. After filtering, the filtrate was acidified with concentrated hydrochloric acid and refluxed for 3 hours. The resulting solution was concentrated to dryness, 100 ml. of water added to the residue and refiltered. The desired thiazine product was recrystallized from ethanol and melted at 201° C.

Example 2

R=isopropyl; $R_1$=methyl; $R_2$ and $R_3$=H in Formula A

A solution of 29.5 grams (0.10 mole) of ethyl α(1-isopropyl - 3 - methyl-4-nitro-5-pyrazolylthio)acetate in 200 ml. of ethyleneglycol monomethylether was placed in a Parr shaker with 9 grams of Raney nickel and treated with hydrogen overnight at a pressure of 3 atmospheres. The mixture was filtered and the filtrate concentrated. To the oily residue was added 300 ml. of xylene and 2 grams of p-toluenesulfonic acid and the mixture was refluxed for 4 hours. After concentrating to dryness, the solid residue was recrystallized from benzene to obtain the desired thiazine compound as a crystalline solid which melted at 180° C.

Examples 3–8

By employing the appropriate substituted pyrazolylthio acetic acid or ester in the procedures described in Examples 1 or 2, other thiazines corresponding to Formula A were prepared wherein R, $R_1$, $R_2$ and $R_3$ were as shown in the table below.

| Ex. No. | R | $R_1$ | $R_2$ | $R_3$ | M.P. in ° C. |
|---|---|---|---|---|---|
| 3 | Methyl | Methyl | H | H | 200 |
| 4 | Methyl | Methyl | Methyl | H | 152 |
| 5 | n-Propyl | Methyl | H | H | 154 |
| 6 | n-Butyl | Methyl | H | H | 121 |
| 7 | Ethyl | Methyl | H | H | 173 |
| 8 | Methyl | n-Propyl | H | H | 145 |

Example 9

R and $R_1$= methyl; $R_2$=H and $R_3$=propargyl in Formula A

Eleven grams (0.06 mole) of the thiazine compound prepared in Example 3 were added to 2.8 grams (0.06 mole) of a 52% sodium hydride-mineral oil dispersion in 150 ml. of benzene and 10 ml. of dimethylformamide and the mixture was refluxed for 3 hours. Thereafter, 7.2 grams (0.06 mole) of propargyl bromide were added and refluxing was continued for 16 hours. The mixture was then filtered and the filtrate was washed with water and concentrated under reduced pressure. The solid residue was recrystallized from benzene-petroleum ether to obtain the desired product which melted at 141° C.

*Examples 10–13*

By substituting the appropriate compound of Formula A wherein $R_3$ is hydrogen and the appropriate $R_3$ halide wherein $R_3$ is other than hydrogen in the procedure of Example 9, other compounds corresponding to Formula A wherein $R_3$ is other than hydrogen were prepared. The melting points of these compounds are shown in the table below.

| Ex. No. | R | $R_1$ | $R_2$ | $R_3$ | M.P. in ° C. |
|---|---|---|---|---|---|
| 10 | $CH_3$ | $CH_3$ | H | $CH_3$ | 110 |
| 11 | $CH_3$ | $CH_3$ | H | $C_2H_5$ | 82 |
| 12 | $CH_3$ | $CH_3$ | H | Allyl | 62 |
| 13 | $CH_3$ | $CH_3$ | H | Benzyl | 100 |

In a manner similar to that described in the foregoing examples, other compounds of Formula A can be readily prepared wherein R, $R_1$ and $R_2$ represent such radicals as phenyl, p-chlorophenyl, o-bromophenyl, p-methylphenyl, o-butylphenyl, p-methoxyphenyl, o-isopropoxyphenyl or hydrogen and $R_3$ represents hydrogen, butyl, p-chlorobenzyl, o-bromobenzyl, p-methylbenzyl, o-butylbenzyl, m-ethoxybenzyl or p-t-butoxybenzyl and the like.

The compounds of Formula B and Formula C employed as starting materials in this invention can be prepared as shown in the reactions below.

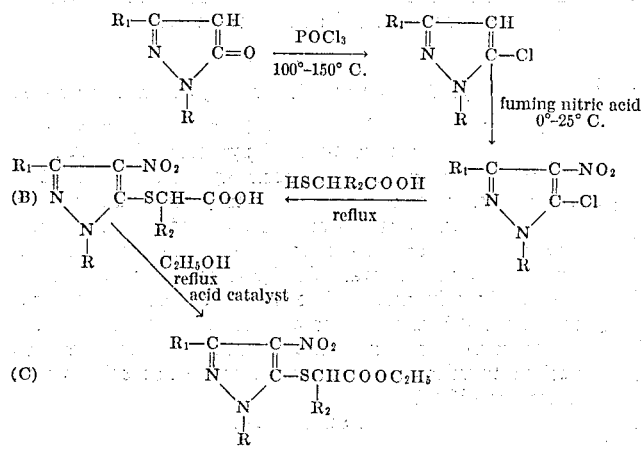

The melting points of typical compounds of Formula B are shown in the following table.

| R | $R_1$ | $R_2$ | M.P. in ° C. |
|---|---|---|---|
| Isopropyl | Methyl | H | 142 |
| Methyl | Methyl | H | 143 |
| Methyl | Methyl | Methyl | 155 |
| n-Propyl | Methyl | H | 128 |
| n-Butyl | Methyl | H | 123 |
| Phenyl | Methyl | H | 145 |
| Methyl | t-Butyl | H | 85 |
| H | Methyl | H | 195 |
| Ethyl | Methyl | H | 135 |
| Methyl | n-Propyl | H | 137 |

Likewise, the melting or boiling points of typical compounds of Formula C were found to be as follows:

| R | $R_1$ | $R_2$ | M.P.* or B.P. in ° C. |
|---|---|---|---|
| Isopropyl | Methyl | H | 74.* |
| Methyl | Methyl | H | 187 at 4 mm. |
| Methyl | Methyl | Methyl | 172 at 2 mm. |
| n-Propyl | Methyl | H | 157 at 0.4 mm. |
| Methyl | t-Butyl | H | 152 at 0.8 mm. |
| Ethyl | Methyl | H | 165 at 1 mm. |
| Methyl | n-Propyl | Methyl | 159 at 0.5 mm. |
| Methyl | n-Propyl | H | 170 at 0.7 mm. |

What we claim is:
1. A compound of the formula

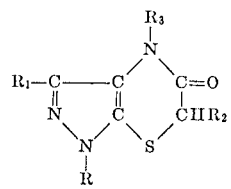

in which R, $R_1$ and $R_2$ are independently selected from the group consisting of hydrogen, loweralkyl, phenyl, halophenyl, loweralkylphenyl and loweralkoxyphenyl and $R_3$ is a member of the group consisting of hydrogen, loweralkyl, loweralkenyl, loweralkynyl, benzyl, halobenzyl, loweralkylbenzyl and loweralkoxybenzyl.

2. A compound as claimed in claim 1 in which R is phenyl, $R_1$ is methyl, $R_2$ is hydrogen and $R_3$ is hydrogen.

3. A compound as claimed in claim 1 in which R is isopropyl, $R_1$ is methyl, $R_2$ is hydrogen and $R_3$ is hydrogen.

4. A compound as claimed in claim 1 in which R is methyl, $R_1$ is methyl, $R_2$ is hydrogen and $R_3$ is hydrogen.

5. A compound as claimed in claim 1 in which R is methyl, $R_1$ is methyl, $R_2$ is methyl and $R_3$ is hydrogen.

6. A compound as claimed in claim 1 in which R is n-propyl, $R_1$ is methyl, $R_2$ is hydrogen and $R_3$ is hydrogen.

7. A compound as claimed in claim 1 in which R is n-butyl, $R_1$ is methyl, $R_2$ is hydrogen and $R_3$ is hydrogen.

8. A compound as claimed in claim 1 in which R is methyl, $R_1$ is methyl, $R_2$ is hydrogen, and $R_3$ is propargyl.

9. A compound as claimed in claim 1 in which R is methyl, $R_1$ is methyl, $R_2$ is hydrogen and $R_3$ is methyl.

10. A compound as claimed in claim 1 in which R is methyl, $R_1$ is methyl, $R_2$ is hydrogen and $R_3$ is ethyl.

11. A compound as claimed in claim 1 in which R is methyl, $R_1$ is methyl, $R_2$ is hydrogen and $R_3$ is allyl.

12. A compound as claimed in claim 1 in which R is methyl, $R_1$ is methyl, $R_2$ is hydrogen and $R_3$ is benzyl.

13. A compound as claimed in claim 1 in which R is ethyl, $R_1$ is methyl, $R_2$ is hydrogen and $R_3$ is hydrogen.

14. A compound as claimed in claim 1 in which R is methyl, $R_1$ is n-propyl, $R_2$ is hydrogen and $R_3$ is hydrogen.

References Cited by the Examiner
UNITED STATES PATENTS

| 3,006,916 | 10/1961 | Winthrop et al. | 260—243 |
| 3,050,553 | 8/1962 | Novello | 260—243 |
| 3,071,584 | 1/1963 | Davis | 260—243 |
| 3,080,364 | 3/1963 | Schroeder | 260—243 |

WALTER A. MODANCE, *Primary Examiner.*

J. M. FORD, *Assistant Examiner.*